United States Patent [19]

Cohen

[11] Patent Number: 5,752,241

[45] Date of Patent: May 12, 1998

[54] METHOD AND APPARATUS FOR ESTIMATING TRANSITIVE CLOSURE AND REACHABILITY

[75] Inventor: Edith Cohen, Chatham, N.J.

[73] Assignee: Lucent Technologies Inc., Murray Hill, N.J.

[21] Appl. No.: 557,223

[22] Filed: Nov. 14, 1995

[51] Int. Cl.$^6$ ........................................... G06F 17/30
[52] U.S. Cl. .......................... 707/3; 707/2; 707/4; 707/5
[58] Field of Search ........................... 395/605, 603, 395/602, 604; 707/3, 5, 2, 4

[56] References Cited

U.S. PATENT DOCUMENTS

| | | | |
|---|---|---|---|
| 5,201,046 | 4/1993 | Goldberg et al. | 707/100 |
| 5,321,833 | 6/1994 | Chang et al. | 707/5 |
| 5,497,486 | 3/1996 | Stolfo et al. | 707/7 |
| 5,504,887 | 4/1996 | Malhotra et al. | 707/205 |
| 5,542,073 | 7/1996 | Schiefer et al. | 707/2 |
| 5,546,571 | 8/1996 | Shan et al. | 707/3 |

OTHER PUBLICATIONS

Edith Cohen, "Estimating the Size of the Transitive Closure in Linear Time", Proceedings 35th Annual Symposium on Foundations of Computer Science, pp. 190–200, Nov. 20, 1994.

Esko Nuutila, Transitive Closure (visited on Jan. 27, 1997), <http://www.cs.fi/~enu/tc.html>, Oct. 9, 1995.

Frederic Andres et al., "Estimating Recursive Query Costs for Various Parallel Environments", IEEE Publications, pp. 365–372, Sep. 1991.

Carlos Escalante et al., "Estimating the Cost of GraphLog Queries", IEEE Publications, pp. 145–148, May 1995.

*Primary Examiner*—Thomas G. Black
*Assistant Examiner*—Greda L. Robinson

[57] ABSTRACT

The invention relates to method and apparatus for computing transitive closure and reachability in directed graphs. These are fundamental graph problems with many applications such as database query optimization. A random rank is applied to each node (or record or element, as the case may be) and the least rank reachable from each such node is determined. This least rank value reachable from a node is highly correlatable to the size of the reachable set. An estimator can therefore be applied to convert the least reachable rank value to an estimate of the size of the reachable set. The accuracy of the estimate can be increased by repeating the random rank assignments together with the least reachable rank determinations and averaging the results.

25 Claims, 5 Drawing Sheets

REACHABILITY SETS: $S(a) = \{a, b, d, f, h\}$  $S(b) = \{b, d, f, h\}$  $S(c) = \{b, c, d, e, f, h\}$
$S(d) = \{d, f, h\}$  $S(e) = \{e\}$  $S(f) = \{f\}$  $S(h) = \{f, h\}$

EXAMPLE: FOR RANKS SUCH THAT $r(e) < r(b) < r(d) < r(a) < r(c) < r(f) < r(h)$
$le(a) = b$, $le(b) = b$, $le(c) = e$, $le(d) = d$, $le(e) = e$, $le(f) = f$, $le(h) = f$

SOME NEIGHBORHOODS: $N(c, 4) = \{b, c, d, e, f, h\}$   $N(d, 1) = \{d, h\}$   $N(h, 3) = \{h\}$
$N(a, 1) = \{a\}$   $N(a, 5) = \{a, b, d, f, h\}$   $N(c, 2) = \{b, c, d, e\}$

EXAMPLE: FOR RANKS SUCH THAT $r(e) < r(b) < r(d) < r(a) < r(c) < r(f) < r(h)$
THE ASSOCIATED LISTS ARE:
a: (2, b) (0, a)   b: (0, b)   c: (2, e) (1, b) (0, c)   d: (0, d)
e: (0, e)   f: (0, f)   h: (4, f) (0, h)

FIG. 4A
CONF VS ACCU FOR n = 20, 50, 100, 200, 500
FIG. 4B
CONF VS ACCU FOR n = 20, 50, 100, 200, 500
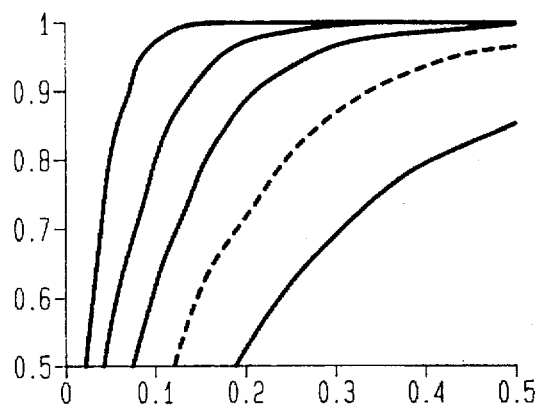
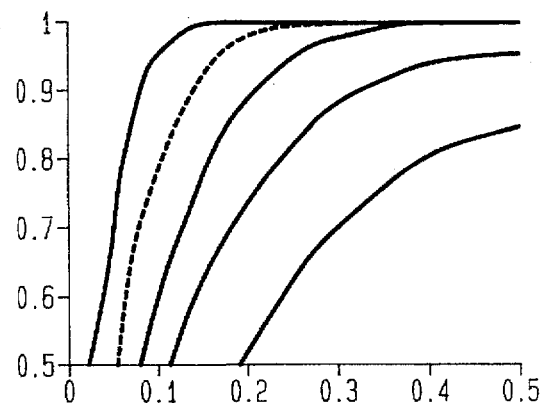
FIG. 4C
CONF VS ACCU FOR n = 10, 15, 20, 30, 40, 50, 100, 200, 500
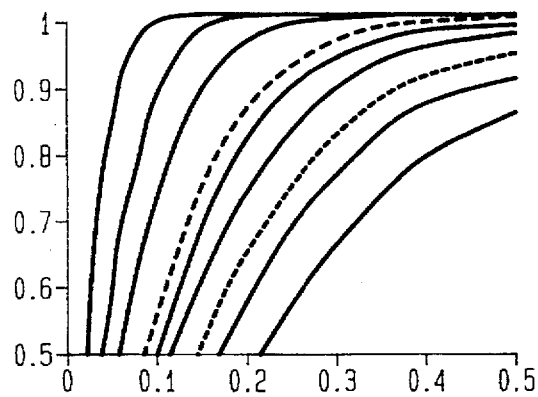
FIG. 5A
CONF FOR n = 0.1, .015, 0.2, 0.25, 0.3, 0.4, 0.5
FIG. 5B
CONF FOR n = 5, 10, 20, 30, 50, 100, 200
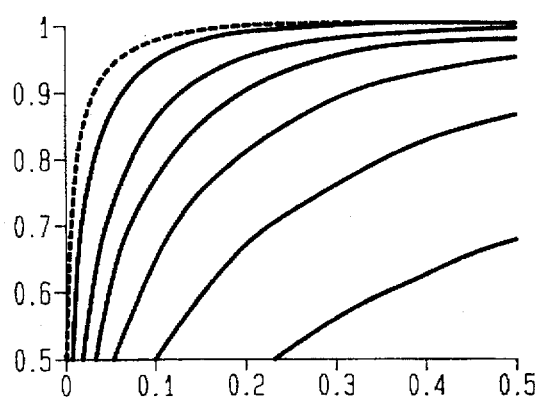
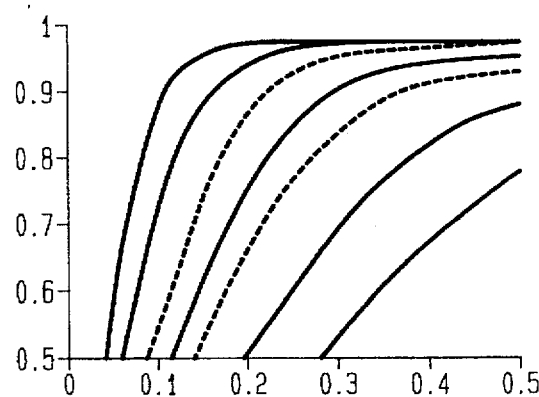

METHOD AND APPARATUS FOR ESTIMATING TRANSITIVE CLOSURE AND REACHABILITY

BACKGROUND OF THE INVENTION

Computing the transitive closure and reachability information in database systems and other directed graph systems is a fundamental problem that has many applications. For example, in the transitive closure all-pairs problem, the goal is to find all the pairs of records or nodes which can reach one another by a directed path or relationship between them. In the single-source reachability problem, the goal is to compute all the records or nodes reachable from a specified source, record, or node. The single-source (or single-sink) reachability problems have been solved using linear-time searching techniques like depth-first or breadth-first searches. The all-pairs problem has been solved by solving a single-source problem for each record or node or, alternatively, by using fast binary matrix multiplication.

In many problems, estimates of the number of reaching or reachable records or nodes, or the size of the transitive closure in an all-pairs problem, are sufficient solutions. In such cases the problem can be solved without investing the time and space for performing the explicit computations. For example, in query optimization in databases, estimates of the query result size are useful when the query size itself is the desired answer or when the query result size is used to determine feasibility of the query.

Further, the estimate of the query result size can be used to determine an efficient order of sub-queries.

SUMMARY OF THE INVENTION

The invention can be illustrated in connection with the least-descendent problem. Assume a database that includes records which identify all the members of a population by name. Each record also identifies the immediate ancestors (parents) and immediate descendents (children). The problem is to determine the total number of descendents (children, grandchildren, great grandchildren, etc.) for each record (person) in the database.

In the first step of the procedure according to the invention each record (person) in the database is assigned a random number rank which may be, for example, any fractional value between 0 and 1.

A determination is made for each record as to the lowest rank reachable therefrom. Rather than searching all descendents that are reachable to determine this lowest rank, the lowest rank determination can be made by working back from the lowest ranked record through the ancestors. Specifically, the lowest ranked record is identified and then by working backward through the successive ancestors, this lowest rank is recorded at each record reachable as an ancestor. The next lowest rank is then similarly stored at all reachable ancestors except that records which already have a stored reachable rank are ignored. The procedure continues storing increasingly higher rank values, but ignoring all records that already have a stored reachable lower rank. As a result, the number of queries necessary becomes smaller and smaller for the higher ranks. The lowest rank that can be reached by each record of the graph is thus stored for each record.

The lowest rank reachable from a record is highly correlatable with the number of records that can be reached. In other words, the larger the number of records that can be reached, the smaller the lowest reachable rank is likely to be. If, for example, half of the records of the database are reachable, there is a high probability that the reachable records will include a very low rank. On the other hand, if there is only a small number of records which can be reached, the lowest ranked value is likely to be higher.

This means that an estimate of the size of the reachable set is inversely related to the lowest ranked value that can be reached. Since the number of reachable records is an estimate based on probability, the accuracy can be increased by repeating the process and averaging the results.

Database query optimization is facilitated by the invention since it provides rapid query size estimates.

Stated in more mathematical terms, the descendent counting problem is to compute for each node $v \in V$, the number of descendents $|S(v)|$. Descendent counting is a fundamental problem and in particular, plays an important role in parallel depth-first search algorithms for planar and general graphs. The invention presents a randomized algorithm that computes an approximate solution to the descendent counting problem on general graphs. When the approximate solution is produced in parallel, it reduces to essentially solving $O(\log n)$ single-source reachability problems. By combining the latter with a planar reachability algorithm, a simple randomized parallel algorithm for approximate descendent counting on general planar graphs is obtained.

The algorithm according to the invention utilizes randomization, but differently, and is faster than previous algorithms. Furthermore, it overcomes other drawbacks of the source-node-sampling based estimations. First, for every node an estimate of the number of nodes reachable from it is obtained. Second, the estimate is accurate with high probability regardless of other conditions on the graph. In addition, the algorithm, which is simple and practical, is expected to be very competitive or even the method of choice in applications where transitive-closure-size estimations are used.

For a rough sketch of the algorithm and some intuition as to why it works for each $v \in V$, denote by $S(v)$ the set of nodes reachable from v. The idea is to obtain in linear time, for each node $v \in V$, a sample from a distribution with parameter $|S(v)|$ (e.g., an exponential distribution). These samples are used to estimate the true value of $|S(v)|$. A subroutine for the least-descendent problem, for a given directed graph with some arbitrary ranking of the nodes (a mapping of the nodes to ranks in 1, . . . ,n), compute a mapping of every node $v \in V$ to the least-ranked node in $S(v)$. Such a mapping can be computed in $O(m)$ time using anyone of the standard linear-time graph searching mehtods (e.g., Depth-First or Breadth-First search). Consider a mapping as above when the ranking of the nodes is a random permutation. Intuitively, for each $v \in V$, the lowest-ranked node in the set $S(v)$ is highly correlated with the size of $S(v)$. For example, if $S(v)$ contains at least half the nodes, it is very likely that the lowest rank of a node in $S(v)$ is very small, and if $S(v)$ contains only one node, we would expect the lowest rank to be around n/2. The algorithm applies the least-descendent subroutine to the graph with random rankings and uses these lowest-ranks to produce, for each $v \in V$, an estimate of $|S(v)|$. The confidence level and the accuracy of the estimates can be increased by considering the mappings produced by several such iterations, where each iteration applies the least-descendent subroutine with a different random permutation.

In effect, the random ranks of the nodes are selected independently from some distribution. The least-descendent subroutine is applied with respect to the induced permutation. The estimator is applied to the rank of the least-descendent. The uniform and the exponential distributions are both analyzed. The independence of the rank assignments turns out to be crucial for other applications (e.g., on-line size estimation) and also extends naturally to a weighted version of the problem (e.g., when the nodes are weighted and the goal is to estimate the weighted sum of descendents.

DEFINITIONS

Directed graphs—applies to any graph problem where there are nodes and information for each node indicating other reachable nodes. The term "directed graph" as used herein is generic to any data set which defines such a problem.

Database—a directed graph wherein the data is in tabular form and wherein the records thereof include information interrelating the records.

Nodes, records or elements—as used herein these are synonymous terms and include reachability information to other nodes, records or elements.

Least rank—the smallest assigned rank value or the smallest reciprocal rank value. For example, if the assigned random ranks have values between 1 and 0, then the least rank would be the smallest rank value. If the assigned random ranks have values greater than 1, then the least rank is the smallest reciprocal rank value.

Estimator—a conversion of the least rank value into a numerical estimate of the size of the reachable set.

BRIEF DESCRIPTION OF THE DRAWINGS

Illustrative embodiments of the invention are fully described in the following specification. The specification includes the drawings wherein:

FIG. 4, which comprise FIGS. 4a and 4b, are diagrams illustrating the confidence levels for n(1−1/e)-selection estimators;

FIG. 5, which comprise FIGS. 5a, 5b, and 5c, are diagrams illustrating the confidence as a function of e when sampling from uniform [0,1];

DETAILED DESCRIPTION OF PREFERRED EMBODIMENTS

Figure 6:
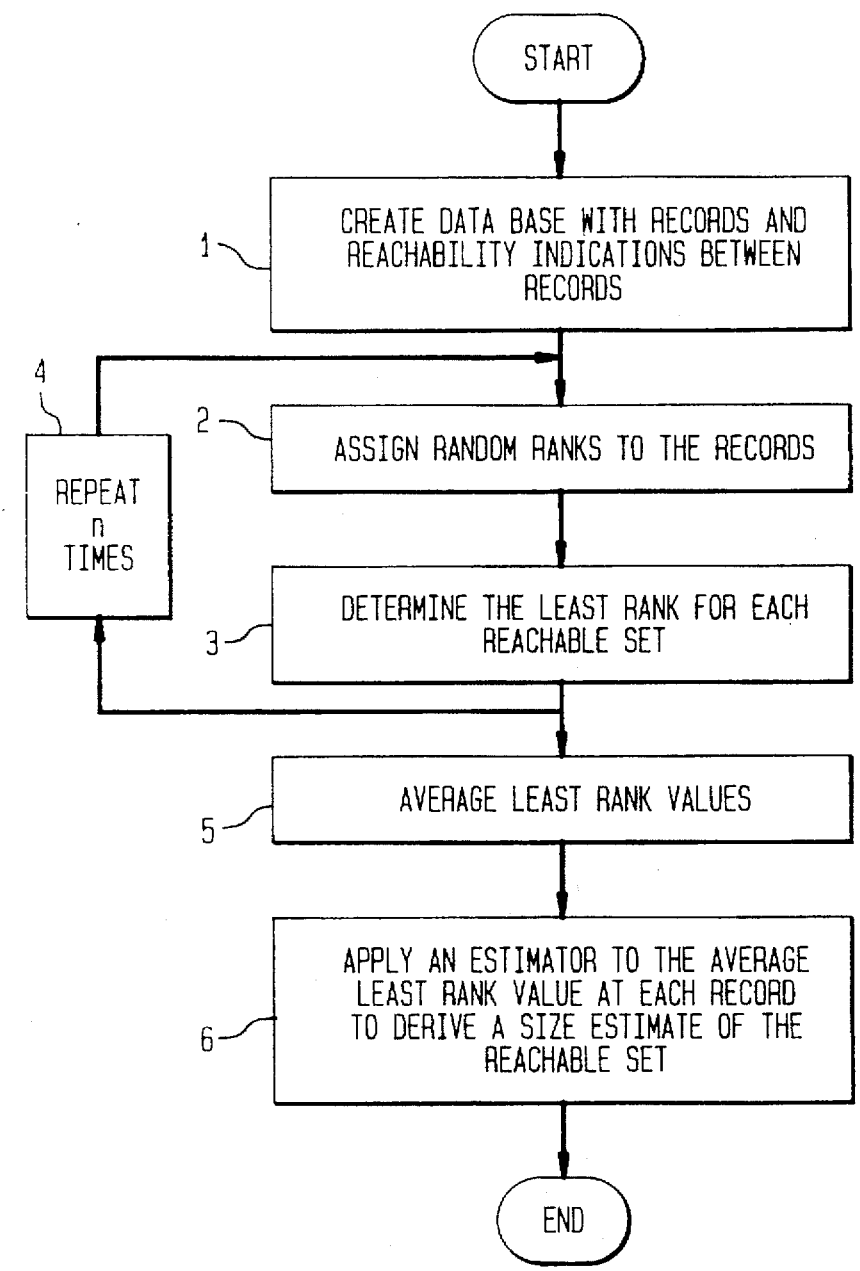
FIG. 6 is a flow diagram indicating the basic steps of the program according to the invention run on a general purpose computer.

The basic flow diagram for the invention as performed on a general purpose computer is illustrated in FIG. 6. General purpose computers are well known, and generally include a microprocessor, random access memory (RAM), and disk memory. A computer program can be stored in the disk memory and uploaded to RAM when being executed by the microprocessor to control the functioning of the computer.

The first step is to create the directed graph (or database) with nodes (records or elements), each such node indicating the other nodes (records or elements) which are reachable therefrom.

Step 2 in the procedure assigns random rank values to the nodes. Preferably the assigned ranks are values between 1 and 0 and have a uniform distribution. However, the ranks can include values greater than 1 and can include weighted distributions.

Step 3 is to determine the least rank for the reachable set from each of the nodes. Assuming the rank values are between 1 and 0, this is preferably accomplished by locating a node V with the smallest rank value and then storing this rank value at all nodes that can reach V. The process is repeated by taking successively larger rank values and storing these rank values at all nodes in the reachable set that have not yet recorded a reachable rank value. In this manner the least rank of the reachable set for each node is determined.

With rank values greater than 1, the least rank value for each reachable set is determined using reciprocals of the assigned ranks.

Next, steps 2 and 3 are repeated n times to determine n least ranked values for each of the nodes. These values are averaged in step 5 and an estimator is then applied to the average value in step 6 to determine the estimated size of the reachable set taking into account the range of random ranks being used as well as the random rank distribution.

Figure 7:
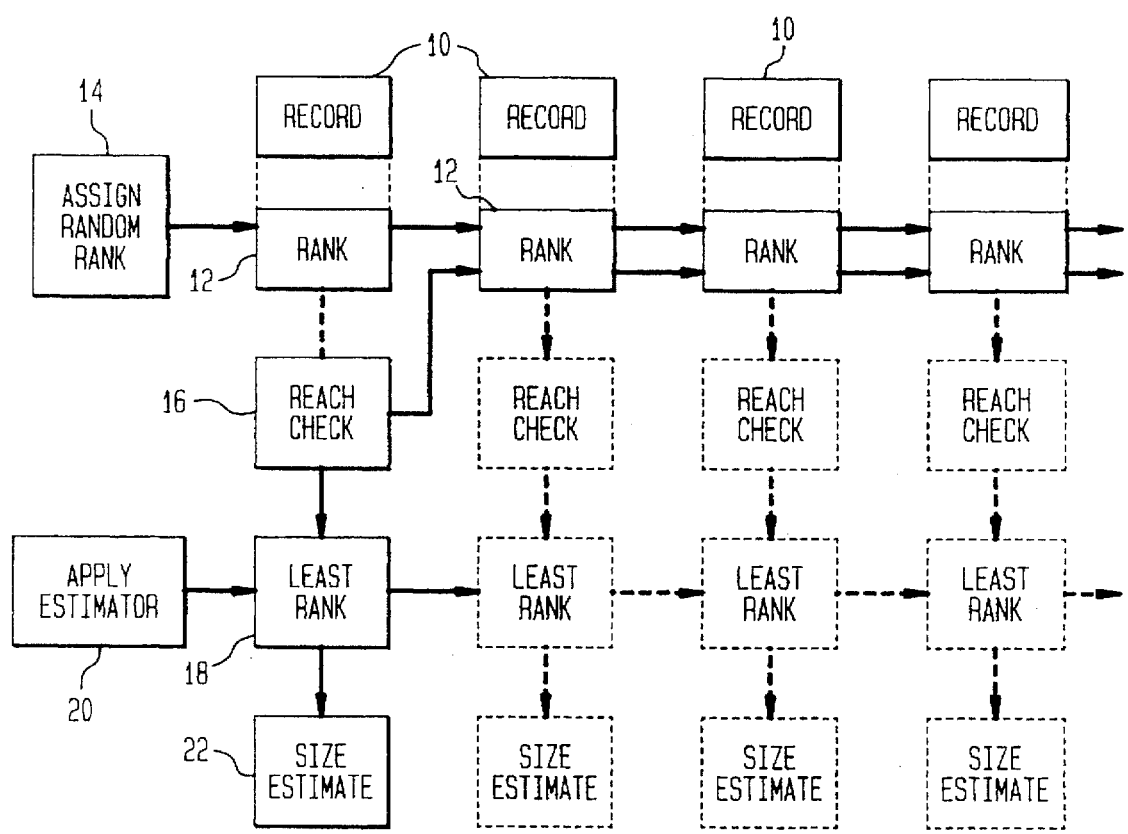
FIG. 7 is a block diagram illustrating the program according to the invention run on a parallel processor.

A parallel implementation of the invention is illustrated in FIG. 7. First, a database is established including a large number of separate records 10 that can be independently accessed. Random ranks 12 (preferably between 1 and 0) are inserted in each record 10. The random ranks are assigned to each record by unit 14.

Reachability check logic 16, associated with each of the records, determines the least rank in the reachability set from each record and stores the least rank 18 as part of each record. The steps of assigning a random rank and determining the least rank of the reachability set for each record can be repeated and the average of the least rank values for a record can be stored for each rank in memory 18.

An estimator is applied by unit 20 to convert the least ranked value 18 into an estimate of the size of the reachable set for the record. The estimate is stored in memory 22 which is part of each individual record.

DEVELOPMENT AND PROOF OF THE ALGORITHM

Figure 1:
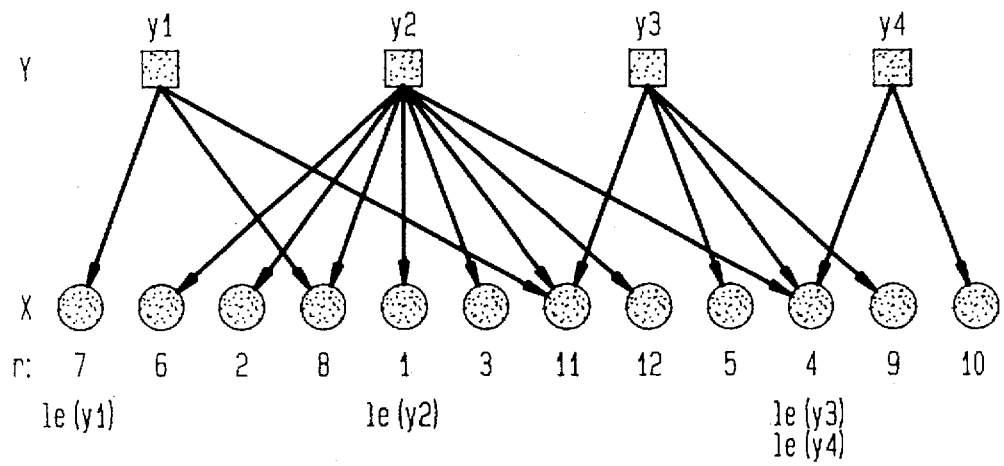
FIG. 1 is a diagram illustrating an example of sets X and Y, an ordering r, and a corresponding mapping.

For the size estimation framework, let X and Y be sets and let $S: Y \rightarrow 2^X$ be a mapping from the elements of Y to subsets of X. Let $\omega: X \rightarrow \mathcal{R}_+$ be nonnegative weights associated with the elements of X. The objective is to compute estimates on $\omega(S(y)) = \Sigma_{x \in S(y)} \omega(x)$ for all $y \in Y$. Assume that the elements of X and Y and the weights are given, but it is costly to compute $\omega(S(y))$ for all $y \in Y$. The following Least-Element Subroutine (LE) is provided as an oracle. When LE is presented with an ordering $r: X \rightarrow \{1, \ldots, |X|\}$ of the elements of X, it returns a mapping le: $Y \rightarrow X$, such that for all $y \in Y$, $le(y) \in S(y)$ and $r(le(y)) = \min_{x \in S(y)} r(x)$. That is, for each element $y \in Y$, LE computes the least element in S(y) with respect to the ordering r. See FIG. 1 for an example of such sets X and Y, some ordering r on the elements of X, and the corresponding mapping le. Only a non-weighted version is considered herein, where all the elements of X have unit weights and the goal is to compute estimates on $|S(y)|$ for all $y \in Y$. These estimates are based on applying LE when the orderings are random permutations.

Proposition 1 If the ordering r is according to ranks of the elements of X that are selected independently at random from the same distribution, then for each $y \in Y$, le(y) has a uniform distribution over S(y).

Proof: Immediate. The ordering is a random permutation and $le(y)$ is the least ranked element in a random permutation.

Consider performing n iterations, where the ith iteration ($1 \leq i \leq n$) is as follows:

i. Select ranks $R_i:X \to \mathcal{R}_+$, independently for each $x \in X$. The distribution from which $R_i(x)$ is selected, is determined from a family of distributions according to the weight $\omega(x)$. Consider using either one of the following two families of distributions:

(1) Exponential distribution with parameter $\omega(x)$: The exponential distribution has probability density function $\omega(x)\exp(-\omega(x)t)$ and distribution function $1-\exp(-\omega(x)t)$ ($t \geq 0$). One way to sample from that distribution is to sample t from Uniform [0,1] and output $-(\ln t)/\omega(x)$. Note that the exponential distribution with parameter $\omega$ is also the distribution of the minimum of $\omega$ independent samples from the exponential distribution with parameter 1.

(2) Minimum of Uniform distributions: The rank of $x \in X$ is sampled from a distribution with probability density function $\omega(x)(1-t)^{\omega(x)-1}$ and distribution function $1-(1-t)^{\omega(x)}$ ($0 \leq t \leq 1$). Note that for unit weights, this reduces to sampling from the uniform distribution on the interval [0,1]. Otherwise, this distribution corresponds to the minimum of $\omega$ samples from Uniform [0,1]. One way to sample directly from that distribution is to sample t from Uniform [0,1] and output $1-t^{1/\omega}$. For the estimation framework to be effective when using this distribution it is required that $\omega(S(y)) \geq 1$ for all $y \in Y$.

ii. Apply LE using the ordering on X induced by the ranks $R_i$. Denote by $le_i:Y \to X$ the mapping returned by LE.

For each element $y \in Y$, estimate $w(S(y))$ by applying an estimator to the values $R_i(le_i(y))$ ($1 \leq i \leq n$). Consider estimators based on:

i. taking an average of the n samples.

Uniform dist. $\quad \hat{s}(y) \equiv \dfrac{n}{\sum_{1 \leq i \leq n} R_i(le_i(y))} - 1$ Exponential dist. $\quad \hat{s}(y) \equiv \dfrac{n}{\sum_{1 \leq i \leq n} R_i(le_i(y))}, \dfrac{n-1}{\sum_{1 \leq i \leq n} R_i(le_i(y))}$ ii. selection from the samples. Let $\tilde{le}(y)$ be any value between the $\lfloor n(1-1/e) \rfloor$ and $\lceil n(1-1/e) \rceil$-smallest values in the sequence $R_i(le_i(y))$ ($1 \leq i \leq n$).

Uniform dist. $\quad \hat{s}(y) \equiv \dfrac{1}{\tilde{le}(y)} - 1$

Exponential dist. $\quad \hat{s}(y) \equiv \dfrac{1}{\tilde{le}(y)}$

As established hereinafter, for each $y \in Y$, the estimator $\hat{s}(y)$ estimates $\omega(S(y))$ with the following confidence and accuracy Levels.

Theorem 2 For all $y \in Y$, for $0 < \epsilon < 1$, $\text{Prob}\{|\omega(S(y))-\hat{s}(y)| \geq \epsilon \omega(S(y))\} = \exp(-O(\epsilon^2 n))$.

for $\epsilon \leq 1$, $\text{Prob}\{|\omega(S(y))-\hat{s}(y)| \geq \epsilon \omega(S(y))\} = \exp(-O((\epsilon n)))$.

Theorem 3 For all $y \in Y$, $E(|w(S(y)) - \hat{s}(y)|/w(S(y))) = O(1/\sqrt{n})$.

Note that the computation of the estimates $\hat{s}(y)$ for all $y \in Y$ amounts to producing n (sorted) random rankings and performing n calls to LE.

For simplicity of presentation, the analysis assumes that the ranks are real numbers selected according to the uniform or exponential distributions. Simple considerations show that it suffices to utilize numbers with a small fixed number of significant bits (to be determined according to the precision desired). It is also easy to see that a sorted list of ranks can be selected without having to apply a sorting subroutine.

Figure 2:
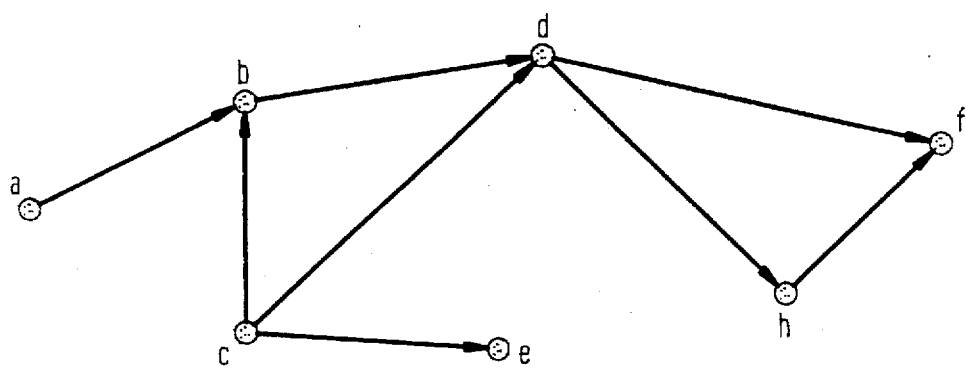
FIG. 2 is a diagram illustrating an example of a graph, an ordering of vertices, and a corresponding mapping.

The foregoing framework can be applied to transitive closure and graph reachability size estimations. The objective is to compute for each $v \in V$ an estimate on $|S(v)|$ (the number of descendants of v) and to compute an estimate on $\Sigma_{v \in V}|S(v)|$ (the size of the transitive closure). The sets X and Y correspond to the vertex set V. The elements of X have unit weights. The mapping S maps each vertex v to the set of vertices reachable from v. The mapping le maps each vertex to the vertex of lowest rank in $S(v)$. See FIG. 2 for an example of a graph, the corresponding reachability sets, and the mapping le with respect to some ranking.

For any given ordering of the vertices, the mapping le can be computed in $O(m)$ time, using any linear-time graph search (e.g., depth-first-search or breadth-first search) as follows. Suppose the vertices $\omega_1, \ldots, \omega_n$ are sorted in increasing order according to their rank.

Algorithm 4 (Least-Descendant Subroutine)

i. Reverse the edge directions of the graph.
   Iterate Step ii until $V = \emptyset$.

ii. Let $i \leftarrow \min\{j|v_j \in V\}$.
   Perform a search to find all vertices $V_i \subset V$ reachable from $v_i$.
   For every $v \in V_i$, let $le(v) \leftarrow v_i$.
   Let $V \leftarrow V \setminus V_i$.
   Remove from E all edges incident to vertices in $V_i$.

The selection of the sorted list of random ranks can be performed in linear time. (Assuming every rank is selected in one time unit.) Therefore, each iteration can be performed in $O(m)$ time.

Suppose that the estimate utilizes k iterations of choosing a random ranking and computing the respective mapping. It follows from Theorems 2 and 3 that the estimation algorithm runs in time $O(km)$ and produces estimates $\hat{s}(v)$ for all $v \in V$ such that i. For all $v \in V$, for $0 < \epsilon \leq 1$, $\text{Prob}\{||S(v)|-\hat{s}(v)| \geq \epsilon |S(v)|\} \leq \exp(-O((\epsilon^2 k)))$.

ii. For all $v \in V$, $E(||S(v)| - \hat{s}(v)|/|S(v)|) = O(1/\sqrt{k})$.

Note that if $k = O(\epsilon^{-2} \log n)$ is chosen, then with probability $1 - O(1/\text{poly}(n))$ the estimates are such that for all $v \in V$, $\dfrac{||S(v)| - \hat{s}(v)|}{|S(v)|} \leq \epsilon$.

Estimator $\hat{T} \equiv \Sigma_{v \in V} \hat{s}(v)$ is used for T, the size of the transitive closure. It follows that if $k = O(\epsilon^{-2} \log n)$ then $\text{Prob}\left\{\dfrac{|T - \hat{T}|}{T} > \epsilon\right\} = O(1/\text{poly}(n))$.

Simple considerations show the following:

Corollary 5

Prob$\{|\hat{T}-T| \geq \epsilon T\} = \exp(-O((\epsilon^2 k)))$.

Proposition 6 $E(|\hat{T} - T|) = O(T/\sqrt{k})$

Proof: Note that $T = \sum_{v \in V} |S(v)|$. Therefore, $$E(|\hat{T} - T|) \leq E\left(\sum_{v \in V} |\hat{s} - |S(v)||\right) =$$

$$\sum_{v \in V} E(|\hat{s} - |S(v)||) = O(1/\sqrt{k}) \sum_{v \in V} |S(v)| = O(T/\sqrt{k}).$$

Our estimate on the size of the closure has asymptotically comparable confidence to estimates on individual reachability sets. This is indeed tight in worst-case scenarios where there is large correlation between reachability sets. For example, in graphs where a large fraction of the nodes have almost identical reachability sets. It most cases, however, the estimate on the size of the closure converges much faster than estimates on individual reachability sets.

A parallel implementation of the reachability estimation algorithm can be considered. A linear-processor polylog-time reduction of the estimation problem to the single-source reachability problem is presented below. Hence, it is advantageous to apply the estimation algorithm in scenarios where single-source reachability can be performed more efficiently than an explicit transitive closure computation. Single-source reachability can be solved efficiently in poly-log time on some restricted families of graphs, for example planar graphs or layered graphs when the number of layers is small. As for general graphs, a reachability algorithm has been presented with tradeoffs between the time and the work performed. An $\tilde{O}(m^2)$ work polylog time single-source reachability algorithm is known that for sparse graphs outperforms the $O(n^{2.38})$ bound for computing the whole transitive closure.

Consider the sequential estimation algorithm according to the invention. The k iterations are independent, and therefore can be performed in parallel. Each iteration amounts to computing random ranks for the vertices, producing the respective ordering, and computing the least-descendant mapping le from each vertex $v \in V$ to the least vertex in $S(v)$. The sequential algorithm computes le by performing a sequence of n dependent partial graph searches. The parallel least-descendant algorithm. performs O(log n) phases. In each phase a collection of disjoint sub-graphs of the original graph is generated. Each phase amounts to performing one single-source reachability computation on each of the subgraphs. These computations result in further partitioning of the subgraphs. Hence, the time and work bounds of the parallel least-descendant computation are at most O(log n) times the time or work bounds of a single-source reachability computation on the input graph. The algorithm partitions the graph recursively. For each subgraph $H=(V_H, E_H)$ in the partition a list $l_H$ of nodes ($l_H \subset V_H$) is maintained that contains, for every $v \in V_H$, the lowest-ranked node in $S(v)$. Initially, the partition includes only the input graph and the associated list contains all nodes. In each phase, the algorithm considers every subgraph H in the partition. If $|l_H|=1$ (the list of H contains a single node), each vertex in $V_H$ is mapped to $v \in l_H$ (for all $u \in V_H$, le(u)$\leftarrow$v) and H is removed. Otherwise, if $|l_H|>1$, a divide-and-conquer subroutine that partitions H into two subgraphs $H_1$, $H_2$ with associated lists $l_{H_1}$, $l_{H_2}$ is applied as follows:

i. $|l_{H_1}| \leq \lceil |l_H|/2 \rceil$ and $|l_{H_2}| \leq \lceil |l_H|/2 \rceil$ ii. for i=1, 2, for each $v \in V_{H_i}$, the lowest-ranked node in S(v) is contained in $l_{H_i}$.

For a sketch of the subroutine that partitions H: Sort $l_H$ according to ranks. Create a super-source comprising of the $\lceil |l_H|/2 \rceil$ lowest-ranked nodes in the list $l_H$. Perform a single-source reachability computation from this super-source. The first subgraph $H_1$ consists of all nodes reachable from the super-source and the edges incident to these nodes. Its associated list $l_{H_1}$ contains the first $\lceil |l_H|/2 \rceil$ nodes in $l_H$. The second subgraph $H_2$ contains all the nodes that were not reachable from the super-source and their incident edges. The list $l_{H_2}$ contains the last $\lfloor |l_H|/2 \rfloor$ nodes in $l_H$. It is easy to verify that if $l_H$ contained le(v) for all $v \in V_H$, then the two subgraphs $H_1$, $H_2$ posses the desired properties. Since the claim holds in the first phase, by induction it holds when the partitioning is halted and the lists contain a single node. Hence, at termination, each subgraph $H=(V_H, E_H)$ is such that the single node $l_H$ is the minimum ranked node in $S(v)$ for all $v \in V_H$. It is easy to see that the algorithm terminates after at most $\lceil \log n \rceil$ phases.

For estimating neighborhood sizes assume a directed graph with nonnegative edge-weights and a collection of query pairs of the form (v,r), where $v \in V$ and r>0. The goal is to estimate, for each pair (v,r), the number of vertices of distance at most r from v.

For $v \in V$ and r>0, the r-neighborhood of v, denoted $N(v,r)=\{u \in V | dist(v,u) \leq r\}$, is the set of vertices that are within distance at most r from v. An estimation algorithm is obtained with the following performance.

Theorem 7 For any k>1, in $O(k(m \log n + n \log^2 n))$ expected time we can produce a data structure that allows us, for each query pair $(v,r) \in V \times \mathcal{R}_+$, in O(k log log n) expected time (O(k log n) worst case time) to compute an estimate $\hat{n}(v,r)$ such that i. For any $\epsilon > 0$, Prob$\{||N(v,r)|-\hat{n}(v,r)| \geq \epsilon |N(v,r)|\} \leq \exp(-O(\epsilon^2 k))$.

$E(||N(v,r)| - \hat{n}(v,r)|/|N(v,r)|) = O(1/\sqrt{k})$.

A choice of $k=O(\epsilon^{-2} \log n)$ would guarantee that with probability 1-O(1/poly(n)), $$\text{for all } (v,r) \in V \times \mathcal{R}_+, \frac{||N(v,r)| - \hat{n}(v,r)|}{|N(v,r)|} \leq \epsilon.$$

In the special case where the graph has unit weights and the interest is in estimating i-neighborhoods for $i \leq r$, where r>0 is some parameter, a data structure can be produced in O(kmr) time such that each query takes O(k) time.

The prior estimation framework can be applied as follows. The set X corresponds to the vertex set V and has unit weights. The set Y corresponds to the collection of all pairs (v,r) such that $v \in V$ and r>0. The mapping S maps each pair (v,r) to $N(v,r) \subset V$. The mapping le, with respect to some ordering of the vertices, maps each pair $v \in V$ and r>0, to the least vertex in N(v,r). Note that it is not feasible to represent the mapping le explicitly for all possible real values of r. Therefore, for each vertex $v \in V$ a least-element list of labeled intervals is produced instead. The expected size of each such list is O(log n). The list of v enables us to obtain le(v,r) for any given $r \in \mathcal{R}_+$ in O(log log n) expected time (by performing a binary search).

The estimation framework performs k iterations. In each iteration ranks for the vertices are selected independently at random. A least-element lists is computed for each $v \in V$. These lists are stored for all k iterations and n vertices. The expected amount of storage needed is O(kn log n). Given these lists, for each query pair (v,r) an estimate ñ(v,r) is obtained by computing the values of le(v,r) in each of the k iterations and applying the estimator to these values. Hence, answering each neighborhood query takes O(k log log n) expected time.

Figure 3:
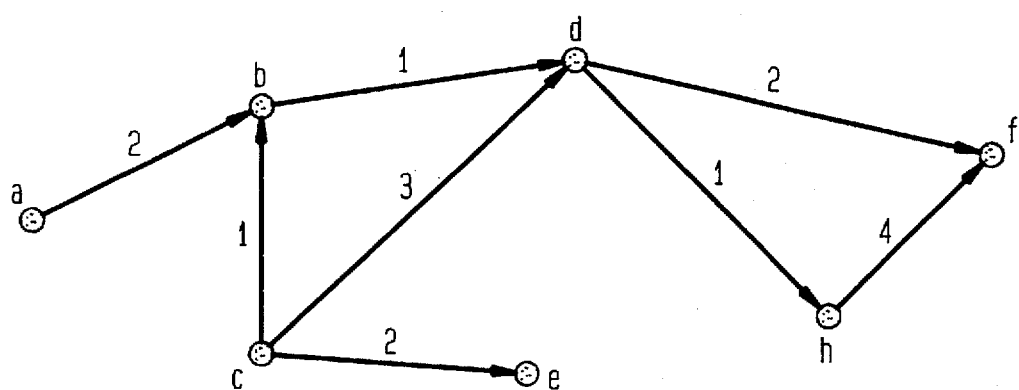
FIG. 3 is a diagram illustrating an example of a weighted graph, an ordering, and the associated lists.

The least-element list of a vertex v∈V is a list of pairs $(a_v(i), u_v(i)) \in R_+ \times V$ ($1 \le i \le l_v$) such that $a_v(1) > \ldots > a_v(l_v) = 0$, and for all $1 \le i \le l_v$, $u_v(i)$ is the least-ranked element in $N(v,x)$ for all $a_v(i-1) \le x \le a_v(i)$ (denote $a_v(0) \equiv \infty$). It is easy to see that $u_v(i)$ are in increasing order. It follows that for any given pair (v,r), le(v,r) can be computed using a binary search on the list of v (find i such that $a_v(i-1) < r \le a_v(i)$ and let le(v,r)←$u_v(i)$). See FIG. 3 for an example of a weighted graph, some neighborhoods, an ordering of the vertices, and the corresponding least-element lists. An algorithm that computes least-element lists for all v∈V is presented below.

Proposition 8 i. If ordering of the vertices is determined by a random permutation then
   (1) the algorithm runs in O(m log n+n log$^2$ n) expected time, and
   (2) the expected size of each list is O(log n).
ii. If the graph has unit weights and the objective is to estimate the size of all i-neighborhoods for i≤r, the algorithm runs in O(mr) time.

Since the expected size of each list is O(log n), and the logarithm function is concave, the expected logarithm of the size of each list is O(log log n). Therefore a binary search on a least-element list and hence the computation of le(v,r) takes O(log log n) expected time and O(log n) worst case time. The proof of Theorem 7 follows using Theorems 2 and 3.

The least-element-lists algorithm and proof of Proposition 8 are presented below. It is assumed that the vertices $v_1, \ldots, v_n$ are sorted according to rank in increasing order.

Algorithm 9 (Compute least-element lists)

i. Reverse the edge directions of the graph.
   For i=1,...,n: $d_i \leftarrow \infty$
   For i=1,...,n: initialize the list of $v_i$ to the empty list.
ii. For i=1,...,n execute the following algorithm:
   (1) Start with an empty heap. Place $v_i$ on the heap with label 0.
   (2) Iterate the following until the heap is empty:
      Remove the vertex $v_k$ of minimum label from the heap. Let d be the label of $v_k$.
      Place the pair $(d,v_i)$ on $v_k$'s list.
      Let $d_k \leftarrow d$.
      For each out-neighbor $v_j$ of $v_k$ do as follows:
      If $v_j$ is in the heap, update its label to the smaller of the current label and $d+\omega(e_{kj})$.
      If $v_j$ is not in the heap, then if $d+\omega(e_{kj}) < d_j$ place $v_j$ on the heap with label $d+\omega(e_{kj})$.

The following Proposition establishes the correctness of the algorithm.

Proposition 10 i. A vertex $v_k$ is placed on the heap in iteration i if and only if $dist(v_i, v_k) < dist(v_j, v_k)$ for all j<i.

ii. If $v_k$ is placed on the heap during iteration i, then the pair $(dist(v_i,v_k), v_i)$ is placed on $v_k$'s list and the value of $d_k$ is updated to be $dist(v_i,v_k)$.

Proof: The first element of the proof is to establish that the proposition holds if at the beginning of iteration i, for every $1 \le k \le n$, $d_k = \min_{j<i} dist(v_j, v_k)$. Consider $v_k$ such that $dist(v_i, v_k) < dist(v_j, v_k)$ for all j<i. It is shown that $v_k$ is placed on the heap and before the end of the iteration has label $dist(v_i,v_k)$. The proof is by induction on the number of edges in the shortest path from $v_i$ to $v_k$. If the path is a single edge, the vertex $v_k$ is placed on the heap in the first iteration, labeled with the weight of that edge. Otherwise, consider the shortest path from $v_i$ to $v_k$. For every vertex $v_j$, on that path, $dist(v_i,v_j') < dist(v_j,v_j')$ for all j<i, since otherwise, if for some j $dist(v_i,v_j') \ge dist(v_j,v_j')$, then $dist(v_i,v_k) > dist(v_j,v_k)$, and a contradiction results. Let $v_k'$ be the next-to-last vertex on the path. The induction hypothesis asserts that $v_{k'}$ was placed on the heap, and was removed when it had label $dist(v_i, v_{k'})$. Therefore, when the neighbors of k' are scanned, k is placed on the heap with label $dist(v_i,v_k)$ or if already in the heap, gets its label updated to $dist(v_i,v_k)$. It remains to prove the assumption that at the end of iteration i, for every $1 \le k \le n$, $d_k = \min_{j \le i} dist(v_j, v_k)$. The proof is straightforward by induction on the iterations, using the claim proved above.

The running time of the algorithm is analysed when implemented with Fibonacci heaps (see, e.g. Introduction to Algorithms by Cormen et. al., McGraw Hill Book Co., New York, 1990). In each iteration, for each placement of a vertex v in the heap, the algorithm examines each of v's out-neighbors and performs at most one label update for each neighbor. When v is removed from the heap, the algorithm performs one operation of finding the minimum labeled element in the heap. Fibonacci heaps use O(log n) time to find a minimum element and O(1) time for an insertion or an update. Let $l_i$ denote the number of iterations in which the vertex $v_i$ was placed on the heap ($1 \le i \le n$). It follows that the running time of the algorithm is $O(\Sigma_{1 \le i \le n} l_i(\log n + \text{outdeg}(v_i)))$. Note that $l_i$ is also the size of $v_i$'s list, since a new pair is added in each iteration that places $v_i$ on the heap.

Proposition 11 If the ordering is a random permutation, the expected size of $l_i$ is O(log n) (for all $1 \le i \le n$).

Proof: Consider an ordering $v_{i_1}, \ldots, v_{i_n}$ of the vertices according to their distance from $v_i$. It follows from Proposition 10 that the vertex $v_i$ is placed on the heap at iteration $i_j$ if and only if for all k<j, $i_j > i_k$. A simple quicksort-type argument concludes the proof.

Therefore, if the ordering is a random permutation, the expected running time of Algorithm 9 is O(m log n+n log$^2$n).

If the graph has unit weights, and the interest is in estimating the size of i-neighborhoods for all i≤r, where r=o(log n), improved bounds can be obtained. Algorithm 9 can be ran with a modified Breadth-first Search ("BFS"). A BFS is conducted in each iteration with a stop at vertices with current $d_i$ smaller than their distance in the current search. In addition, each BFS is performed only up to distance r. Note that a vertex is active in the BFS in at most r iterations. It follows that the algorithm runs in deterministic time O(mr), and explicitly produces le(v,i) for all v∈V and i≤r.

Consider next the estimation framework when ranks of elements x∈X are selected according to the exponential or uniform distributions. For all y∈Y, the minimum rank of an element in S(y) has distribution $M^{(w(S(y)))}$ that depends only on w(S(y)). The form of $M^{(k)}$ is considered when the ranks are selected using either family of distributions. Each iteration of the estimation framework supplies a random sample from $M^{(w(S(y)))}$. The estimation framework estimates k=w(S(y)) by applying an estimator $\hat{k}: R^n \to R$ to n independent samples from $M^{(k)}$ (obtained in n iterations). Also discussed are criteria for measuring the performance of different estimators.

For exponentially distributed ranks, the exponential distribution with parameter w has density function $we^{-wx}$ (x≥0), distribution function $1-e^{-wx}$ (x≥0), expected value 1/w, and variance $1/w^2$.

Suppose that the estimation algorithm selects the rank of an element x∈X with weight w(x) from the exponential distribution with parameter w(x). $M^{(k)}$ denotes the r.v. that is the minimum of $l$ independent exponential r.v.'s with weights $w_1, \ldots, w_l$, where $$k = \sum_{i=1}^{l} w_i.$$

It follows from properties of the exponential distribution that $M^{(k)}$ is exponentially distributed with parameter k. Hence, $M^{(k)}$ has density $ke^{-kx}$, distribution $1-e^{-kx}$ ($x \geq 0$), expected value $\mu = 1/k$ and variance $1/k^2$.

For uniformly distributed ranks and for a parameter $k>1$, consider the distribution $M^{(k)}$ such that for $0 \leq t \leq 1$ Prob$\{M^{(k)} \geq t\} = (1-t)^k$. Note that for integral values of k, $M^{(k)}$ is the distribution of the minimum of k independent r.v.'s uniformly sampled from the interval $[0, 1]$. $M^{(k)}$ has distribution function $1-(1-t)^k$, probability density function $k(1-t)^{k-1}$ ($0 \leq t \leq 1$), expectation $$E(M^{(k)}) = \int_0^1 kx(1-x)^{k-1} dx = 1/(1+k),$$

second moment $$E(M^{(k)^2}) = \int_0^1 kx^2(1-x)^{k-1} dx = 2/((2+k)(1+k)),$$

and hence, variance $$\text{Var}(M^{(k)}) = E(M^{(k)^2}) - E(M^{(k)})^2 = k/((2+k)(1+k)^2).$$

Consider assigning for each element $x \in X$ a rank sampled from the distribution $M^{w(x)}$. Note that if the element has unit weights the distribution $M^{(1)}$ is the uniform distribution on $[0,1]$. Consider a r.v. x that corresponds to the minimum of $l$ elements independently sampled from distributions $M^{(w_i)}$ ($i=1, \ldots l$). For $0 \leq t \leq 1$:

$$\text{Prob}\{x \geq t\} = \prod_{i=1}^{l}(1-t)^{w_i} = (1-t)^{\sum_{i=1}^{l} w_i}.$$

It follows that the minimum rank of $l$ elements with weights $w_1, \ldots, w_l$ has distribution $M^{(k)}$, where $$k = \sum_{i=1}^{l} w_i.$$

Some basic notions from the theory of statistical inference are next reviewed in the context of the framework. Consider the following problem. Assume n independent values $M_i^{(k)}$ ($1 \leq i \leq n$) from a distribution $M^{(k)}$ are given for some unknown $k>0$. An estimate of k is desired. The estimator $\hat{k}$ is a mapping of the form $\hat{k}: \mathcal{R}_+^n \to \mathcal{R}_+$. The objective is to find an estimator that minimizes the maximum, over $k>0$ ($k \geq 1$ if the uniform distribution is used), of the expected value of $W(k, \hat{k})$, where W is the "loss" when the real answer is k, but the estimate is $\hat{k}$. In other words, an optimal minimax estimator according to the loss function $W(k, \hat{k})$ is desired. An optimal estimator $\hat{k}$ would minimize $$\max_{k>0} \int_0^\infty \ldots \int_0^\infty W(k, \hat{k}(x_1, \ldots, x_n)) \left( \prod_{i=1}^{n} f^{(k)}(x_i) \right) dx_1 \ldots dx_n,$$

where $f^{(k)}(x)$ is the probability density function of $M^{(k)}$.

When the ranks are chosen uniformly at random, then for each $y \in Y$, $R(le(y))$ is distributed like $M^{(w(S(y)))}$. Hence, the estimation problem is: given values from the distribution $M^{(w(S(y)))}$, estimate $w(S(y))$.

One considered loss function is $$W(k, \hat{k}) = \begin{cases} 0 & \text{when } k(1-\epsilon) \leq \hat{k} \leq k(1+\epsilon) \\ 1 & \text{otherwise} \end{cases}$$

This loss function means that all estimates such that $|\hat{k}-k| \leq k\epsilon$ are desirable and all other estimates are equally undesirable. It measures the confidence level that the estimate has a relative error of at most $\epsilon$. (This corresponds to the bound in Theorem 2.)

Another considered loss function, which measures the average relative error, is:

$$W(k, \hat{k}(x_1, \ldots, x_n)) = |\hat{k}(x_1, \ldots, x_n) - k|/k$$

(This corresponds to the bound in Theorem 3.), the loss function $$W(k, \hat{k}) = \left( \frac{\hat{k}-k}{k} \right)^2$$

that measures the Variance of the estimator. For some applications we would like the estimator to be unbiased (have expectation equal to the value estimated). The estimator is unbiased if $$\forall k > 0,$$

$$\int_0^\infty \ldots \int_0^\infty (k - \hat{k}(x_1, \ldots, x_n)) \left( \prod_{i=1}^{n} f^{(k)}(x_i) \right) dx_1 \ldots dx_n = 0.$$

Remark 12 The analysis provided is with respect to the minimax criteria and when the value k could assume any positive value. Note further that i. If the value k is known to be more restricted, better minimax estimators can be obtained (this may be useful even in the context of estimating reachability, if the graph has certain known structure).

ii. In some applications it may make sense to use a Bayes optimal estimator with respect to some a priori distribution p(k) on the values of k. In the latter case, the goal is to find an estimator that minimizes $$\sum_{k>0} p(k) \int_0^\infty \ldots \int_0^\infty W(k, \hat{k}(x_1, \ldots, x_n)) \left( \prod_{i=1}^{n} f^{(k)}(x_i) \right) dx_1 \ldots dx_n.$$

Asymptotic analysis of the performance of selection-based estimators is next provided. The estimation algorithm performs n iterations and the $\lfloor n(1-1/e) \rfloor$-smallest value is selected as an estimator of the expected value. The analysis for the exponential distribution is provided. A very similar argument establishes that the same asymptotic bounds hold when sampling from the uniform distribution, provided that the weight of the estimated quantities is larger than some constant (e.g., $k \geq 1$).)

Consider the estimation framework when the ranks are drawn independently from the exponential distribution. For an integer $n \geq 1$ and $k > 0$, denote by $S^{(k,n)}$ the $\lfloor n(1-1/e) \rfloor$-smallest value amongst n independent random variables distributed according to $M^{(k)}$. Recall that $\mu = 1/k$ is the expected value of $M^{(k)}$.

$$\text{Prob}\{S^{(k,n)} \geq (1+\epsilon)\mu\} = \begin{cases} \text{if } \epsilon < 1, & \exp(-O(\epsilon^2 n)) \\ \text{if } \epsilon > 1, & \exp(-O(n\epsilon)) \end{cases}$$

Proof: Let $p = \text{Prob}\{M^{(k)} \geq (1+\epsilon)\mu\}$. Note that $p = \exp(-(1+\epsilon))$. Let the r.v. $X_n$ be the number of successful trials among n Bernoulli trials with probability of success p. This leaves $$\text{Prob}\{S^{(k,n)} \geq (1+\epsilon)\mu\} = \text{Prob}\{X_n \geq \lceil n/e \rceil\} = \sum_{i=\lceil n/e \rceil}^{n} b(i;n,p).$$

Applying Chernoff's bound (H. Chernoff, "A measure of the asymptotic efficiency for test of a hypothesis based on the sum of observations," *Annals of Math. Statistics*, 23, 493–509, 1952.)

$$\text{Prob}\{X_n \geq n/e\} \leq \text{Prob}\{|X_n - np| \geq np(1 - 1/(pe))\}$$

$$\text{Prob}\{X_n \geq n/e\} \leq \text{Prob}\{|X_n - np| \geq np(1 - 1/(pe))\}$$
$$\leq \exp(-(1 - 1/(pe))^2 np/2)$$
$$= \exp(-(1 - e^\epsilon)^2 n e^{-1-\epsilon}/2).$$

The proof follows.

$$\text{Prob}\{S^{(k,n)} \leq (1-\epsilon)\mu\} = \begin{cases} \text{if } \epsilon \leq 1/2, & \exp(-O(\epsilon^2 n)) \\ \text{if } 1 > \epsilon \geq 1/2, & \exp(-O(n/(1-\epsilon))) \\ \text{if } \epsilon = 1, & 0 \end{cases}$$

Proof: Let $p = \text{Prob}\{M^{(k)} \leq (1-\epsilon)\mu\}$. Hence, $p = 1 - \exp(-(1-\epsilon))$. Let the r.v. $X_n$ be the number of successful trials among n Bernoulli trials with probability of success p. Note that $$\text{Prob}\{S^{(k,n)} \leq (1-\epsilon)\mu\} =$$

$$\text{Prob}\{X_n \geq \lfloor n(1-1/e) \rfloor\} = \sum_{i=\lfloor n(1-1/e) \rfloor}^{n} b(i;n,p).$$

Applying Chernoff's bound we obtain $$\text{Prob}\{X_n \geq n(1-1/e) - 1\} \leq \text{Prob}\left\{|X_n - np| \geq np\left(1 - \frac{e-1}{pe} - \frac{1}{np}\right)\right\}$$

$$\leq \exp\left(-\left(1 - \frac{e-1}{pe} - \frac{1}{np}\right)^2 np/2\right)$$

$$= \exp\left(-\frac{(1 - e^\epsilon - e/n)^2 n}{2e(e - e^\epsilon)}\right).$$

The proof follows.

Consider the estimator $\hat{k} = 1/S^{(k,n)}$. We bound the relative error of $\hat{k}$.

Corollary 15

For $\epsilon < 1$, $\text{Prob}\left\{\frac{|k - \hat{k}|}{k} \geq \epsilon\right\} = \exp(-O(\epsilon^2 n))$ For $\epsilon \geq 1$, $\text{Prob}\left\{\frac{|k - \hat{k}|}{k} \geq \epsilon\right\} = \exp(-O(\epsilon n))$ Proof: Applying Propositions 13 and 14. When $\epsilon < 1$, $$\text{Prob}\left\{\frac{|k - \hat{k}|}{k} \geq \epsilon\right\} = \text{Prob}\{\hat{k} \leq (1-\epsilon)k\} + \text{Prob}\{\hat{k} \geq (1+\epsilon)k\}$$

$$= \text{Prob}\{S^{(k,n)} \geq \mu/(1-\epsilon)\} + \text{Prob}\{S^{(k,n)} \leq \mu/(1+\epsilon)\}$$

$$\leq \text{Prob}\{S^{(k,n)} \geq \mu(1+\epsilon)\} + \text{Prob}\{S^{(k,n)} \leq \mu(1-\epsilon/2)\}$$

$$= \exp(-O(\epsilon^2 n)).$$

When $\epsilon \geq 1$,

-continued
$$\text{Prob}\left\{\frac{|\hat{k}-k|}{k} \geq \epsilon\right\} = \text{Prob}\{S^{(k,n)} \leq \mu/(1+\epsilon)\}$$
$$= \exp(-O((1+\epsilon)n))$$
$$= \exp(-O(\epsilon n)).$$

The expected relative error of the estimator is bounded:

Proposition 16 $E(|k - \hat{k}|/k) = O(1/\sqrt{n})$

Proof: It follows from Corollary 15 that for some constant c, for all $n \geq 1$, $$E(|k-\hat{k}|/k) \leq \int_0^1 x\left(-\frac{d}{dx}\exp(-cx^2n)\right)dx + \int_1^\infty x\left(-\frac{d}{dx}(\exp(-cxn))\right)dx$$
$$\leq \int_0^1 2cnx^2\exp(-cx^2n)dx + \int_1^\infty cnx\exp(-cxn)dx.$$

Note that the function $x^2 \exp(-cx^2n)$ is increasing in the interval $0 \leq x \leq 1/\sqrt{2cn}$, and decreasing for $x \geq 1/\sqrt{2cn}$. The following is obtained $$\int_1^\infty nx\exp(-cxn)dx = \exp(-O(n)).$$

$$\int_0^{1/\sqrt{2cn}} nx^2\exp(-cx^2n)dx \leq \int_0^{1/\sqrt{2cn}} nx^2 dx = O(1/\sqrt{n}).$$

$$\int_{1/\sqrt{2cn}}^1 nx^2\exp(-cx^2n)dx \leq (1/\sqrt{2cn})n \sum_{i=1}^{\sqrt{2cn}} (i/\sqrt{2cn})^2 \exp(-i^2)$$
$$\leq (2cn)^{-1.5}n \sum_{i \geq 1} i^2\exp(-i^2) = O(1/\sqrt{n}).$$

Average-based estimators are next analyzed. Let $x_1, \ldots, x_n$ be independent samples from the distribution $M^{(k)}$ for some unknown $k>0$. For integers $n \geq 1$ and $k \geq 1$, denote by $$S^{(k,n)} = \sum_{i=1}^n x_i/n$$

the sum, divided by n, of n independent random variables distributed according to $M^{(k)}$. The estimation framework obtains an estimate of k by applying an estimator to $x_1, \ldots, x_n$. We consider the estimators uniform dist. $\hat{k}(x_1, \ldots x_n) = \max\{1, n/\Sigma_{1 \leq i \leq n} x_i\} - 1\}$ exponential dist. $\hat{k}(x_1, \ldots x_n) = n/(\Sigma_{1 \leq i \leq n} x_i)$ A bound is provided for the maximum, over $k>0$, of the expected losses incurred by the estimator $\hat{k}$ when the true value is k. Theorems 2 and 3 hold when the Exponential distribution is used in determining the ranks. Similar arguments apply when the ranks are sampled according to the uniform distribution, when $k \geq 1$.

Billingsley (P. Billingsley, *Probability and measure*, John Wiley & Sons, NY, 1986, pp. 368) considers as an example in his book the problem of estimating the unknown parameter k of an exponential distribution, given n independent samples from that distribution. As a consequence of the Central Limit theorem and of Skorohod's theorem he obtains that the distribution of the r.v.

$$\frac{\sqrt{n}}{k}(1/S^{(k,n)} - k)$$

converges to the Normal distribution with zero mean and unit variance. That is, for every $\eta$, $$\lim_{n \to \infty} \text{Prob}\left\{\frac{\sqrt{n}}{k}(1/S^{(k,n)} - k) \leq \eta\right\} = \Phi(\eta),$$

where $$\Phi(t) = \frac{1}{\sqrt{2\pi}} \int_{-\infty}^t \exp(-x^2/2)dx$$

is the distribution function of the normal distribution.

$$\text{Prob}\left\{\frac{|k-\hat{k}|}{k} \geq \epsilon\right\} = \text{Prob}\left\{\sqrt{n}\frac{|k-\hat{k}|}{k} \geq \sqrt{n}\epsilon\right\}$$
$$\to 2\Phi(-\epsilon\sqrt{n}) \leq \frac{2\exp(n\epsilon^2/2)}{\epsilon\sqrt{2\pi n}}$$
$$= e^{O(-\epsilon^2 n)}$$

The last inequality follows from bounds on the tail of the Normal distribution (see, e.g., W. Feller, *An introduction to probability theory and its applications*, John Wiley & Sons, NY, 1968. pp. 175). The expected relative error converges to $$E\left(\frac{|1/S^{(k,n)} - k|}{k}\right) = \frac{1}{\sqrt{n}} E\left(\sqrt{n}\frac{|k-\hat{k}|}{k}\right)$$
$$\to \frac{2}{\sqrt{2\pi n}} \int_0^\infty x\exp{-x^2/2}dx = \sqrt{\frac{2}{\pi n}}$$

The convergence in probability to the Normal distribution demonstrates that the asymptotic bounds are essentially optimal.

Below we consider the probability density and distribution functions of the estimator and of the relative error. The sum $nS^{(n,k)}$ of n independent r.v.'s drawn from $M^{(k)}$ has density and distribution functions $$g_{n,k}(x) = k \frac{(kx)^{n-1}}{(n-1)!} e^{-kx}$$

$$G_{n,k}(x) = 1 - e^{-kx} \left( 1 + \sum_{i=1}^{n-1} \frac{(kx)^i}{i!} \right),$$

where $x \geq 0$. Consider the estimator $\hat{k} = 1/S^{(n,k)}$ and the random variable $y = k/\hat{k}$. The density and distribution functions of y are independent of k and are given by $$f_n(y) = \frac{n^n}{(n-1)!} y^{n-1} e^{-ny}$$

$$F_n(y) = 1 - e^{-ny} \left( 1 + \sum_{i=1}^{n-1} \frac{(ny)^i}{i!} \right)$$

for $y \geq 0$. It follows that $$\text{Prob}\{\hat{k} \geq k(1+\epsilon)\} = \text{Prob}\{y \leq 1/(1+\epsilon)\}$$
$$= 1 - e^{-n/(1+\epsilon)} \left( 1 + \sum_{i=1}^{n-1} \frac{(n/(1+\epsilon))^i}{i!} \right)$$

$$\text{Prob}\{\hat{k} \leq k(1-\epsilon)\} = \text{Prob}\{y \geq 1/(1-\epsilon))\}$$
$$= 1 - e^{-n/(1-\epsilon)} \left( 1 + \sum_{i=1}^{n-1} \frac{(n/(1-\epsilon))^i}{i!} \right)$$

Hence, $$\text{Prob}\left\{ \frac{|\hat{k}-k|}{k} \geq \epsilon \right\} =$$
$$1 - e^{-n/(1+\epsilon)} \left( 1 + \sum_{i=1}^{n-1} \frac{(n/(1+\epsilon))^i}{i!} \right) +$$
$$e^{-n/(1+\epsilon)} \left( 1 + \sum_{i=1}^{n-1} \frac{(n/(1-\epsilon))^i}{i!} \right).$$

Computing $$E(|k/\hat{k} - 1|) = E(|y-1|) = \int_{y=0}^{\infty} \frac{n^n y^{n-1}}{(n-1)!} e^{-ny} |1-y| dy$$

results in $$\int_{y=1}^{\infty} \frac{n^n y^{n-1}}{(n-1)!} e^{-ny} (y-1) dy = (n/e)^n/n!,$$

$$\int_{y=0}^{1} \frac{n^n y^{n-1}}{(n-1)!} e^{-ny} (1-y) dy = (n/e)^n/n!.$$

Hence, using Stirling's formula $$E(|k/\hat{k} - 1|) = 2(n/e)^n/n! \approx \sqrt{2/(\pi n)}.$$

for some fixed constant $\alpha > 0$. The intuition is that in each iteration, the probability that $le(v) = le(u)$ is $$|S(v) \cap S(u)|/|S(v) \cup S(u)|.$$

This probability can be estimated by counting the number of equal components in v's and u's lists and dividing it by k. Estimating sizes of unions of neighborhoods. Consider the lists of size k produced by k iterations of the algorithm.

These lists can be used to estimate for any given subset of vertices $U \subset V$, the number of vertices reachable from U, $|\cup_{u \in U} S(u)|$. The estimate on $|\cup_{u \in U} S(u)|$ is produced in $O(|U|k)$ time by applying the estimator to the k-vector obtained by a coordinate-wise minima of the lists of the vertices in U (the minimum in each coordinate is with respects to the ordering induced by the ranks). It is easy to see that the confidence and accuracy levels of the estimate are the same as for single vertices. Similarly, for weighted graphs we can estimate $|\cup_{u \in U} N(u, r)|$, the size of the union of the r-neighborhoods of vertices in U.

On-line estimation of weights of growing sets. The estimation framework is admissible in on-line settings where the goal is to produce estimates on-line of the weights of dynamically growing sets. Consider the following scenario. Let X be a set of elements with positive weights w: $X \to R_+$. Let Y be a collection of subsets of X. The admissible operations on the subsets are:

i. Create a new subset (initialized to $\emptyset$ or a copy of another subset).

ii. Add a new weighted element x to one or more subsets.

iii. Merge two subsets $\{y, y'\} \subset Y$ (replace y by $y \cup y'$).

iv. Weight-query: For a subset $y \in Y$, produce an estimate of w(y).

A straightforward way to support these operations is by explicitly maintaining the contents of each subset. The estimation framework allows to support this data structure and operations efficiently while providing high confidence and accuracy estimates for the weights. An outline of the method is sketched. For each subset, a small size vector is maintained. The entries of a vector that corresponds to the empty subset are initialized to $+\infty$. A merge of two subsets amounts to performing coordinate-wise minima of the two vectors. Adding a new element x to some subsets amounts to drawing a random ranks vector for x and taking a coordinate-wise minima of the vector of x with the vectors of all the subsets x is added to weight estimate for a subset y is obtained by applying an estimator to the entries of the vector of y. This application was conceived for even counting in a distributed system of communicating processes.

A proof sketch of Theorems 2 and 3 for the estimator k is provided. Note that $\text{Prob}\{\hat{k} \geq k(1+\epsilon)\}$ equals the probability that a Poisson distribution with expectation $$\Lambda = \frac{n}{1+\epsilon}$$

has n or more successes. $\text{Prob}\{\hat{k} \leq k(1-\epsilon)\}$ equals the probability that a Poisson distribution with $$\Lambda = \frac{n}{1-\epsilon}$$

has n or fewer successes. The asymptotic bounds are obtained by approximating the Poisson distribution as a limit of Binomial distributions, and applying the Chernoff bounds.

The estimation framework is based on performing a number n of iterations. The estimate quality improves as more iterations are allowed. Hence, the number of iteration is determined according to the desired estimate quality (confidence level and accuracy). Sampling based on either the uniform or exponential distributions and estimators based on selection or the average of samples are considered. All four combinations above exhibit the same asymptotic behavior. Experiments show that the average-based estimators perform significantly better than the selection-based ones, that is, require a much smaller number of iterations for similar confidence and accuracy levels. As for average-based estimators, sampling from the exponential distribution yields slightly better performance (for the same number of iterations) than when sampling from the uniform distribution. FIG. 4 provides plots for the performance of selection-based estimators with sampling with either the exponential or the uniform distributions. The figure plots the confidence level as a function of the accuracy for various numbers of iterations n. The plots were obtained using simulations, where k=40 was used for the uniform distribution. FIG. 5 plots the performance of average-based estimator with sampling from the uniform or exponential distributions. For the uniform distribution, the figure contains a plot of the confidence level as a function of the accuracy for various numbers of iterations n. The plot was obtained using simulations. For the exponential distribution, the figure contains plots of the confidence level as a function of the number of rounds n and the accuracy $\epsilon$.

Additional applications and extensions of this work are next discussed.

Computing the transitive closure. The transitive closure size estimation algorithm can be applied to compute reachability information as follows. Each iteration of the algorithm computes, for each vertex, one of the vertices in $S(v)$, selected uniformly at random (see Proposition 1). (Note, however, that in a given iteration these selections are not independent for different vertices.) It follows that for each $v \in V$, after $O(|S(v)| \log |S(v)|)$ iterations, with probability $1 - O(1/\text{poly } n)$, all of $S(v)$ is computed. It follows that after $\max_v |S(v)| \log n \leq n \log n$ iterations with high probability $(1 - O(1/\text{poly } n))$ the whole transitive closure is computed. The latter transitive closure algorithm has, like previous algorithms, a $\tilde{O}(mn)$ worst case bound, but is faster than others for some families of graphs.

Estimating similarities between reachability sets. Consider the estimation algorithm. In each iteration, for each vertex $v \in V$, the algorithm computes a vertex in $S(v)$. After k iterations we have for each $v \in V$, a list of k vertices in $S(v)$. The lists of different vertices are correlated and can be used to estimate "similarities" between the sets of vertices reachable from different vertices. That is, to determine with high confidence whether two vertices $\{v, u\}$ are such that $$|S(v) \cap S(u)| \geq a |S(v) \cup S(u)|,$$

Considering ith least-ranked elements. In some situations it is reasonable to apply an estimator to the rank of the nth-least-ranked elements in a set instead of to the least-ranked elements from n different iterations. A more general statement is to perform n/i iterations where in each iteration the rank of the ith-least-ranked element is considered. Typically i is chosen to be as large as possible under the condition that it is quite unlikely that for the estimated sets some element has least-rank more than once, when using i different iterations. In the application listed here (estimating reachability and neighborhood sizes) the computation involved in obtaining the ith-least elements is comparable to performing i iterations. Hence, the main benefit of using ith least-ranked element is saving random bits. (Since each iteration supplies all the elements of X with new random ranks.) In some applications of the estimation framework the use of ith least-ranked elements reduces the amount of computation as well as saving random bits. For example, in on-line applications (as sketched above) if the number of sets is much smaller than the number of elements. For each new element a single random number is drawn instead of a vector of random numbers. For each subset a list of the n smallest ranks encountered is obtained. Merging two sets amounts to taking the n smallest ranks in the union of the two lists.

I claim:

1. A database query method using estimates of the size of reachability sets in a database including a plurality of elements each including reachability information to other elements comprising the steps:

assigning random ranks to elements in the database;

computing the rank of the least ranked element in each of a plurality of reachability sets;

applying an estimator to the rank of the least ranked element in each of the plurality of reachability sets to provide an estimate of the size of each of the plurality of reachability sets;

using said estimate of the size of each of the plurality of reachability sets to perform a database query.

2. A database query method according to claim 1 wherein said assigned random ranks have random values between 1 and 0, and the estimated size of a reachable set is a function of the reciprocal of the least ranked reachable element value.

3. A database query method according to claim 1 wherein said assigned random ranks have random values greater than 1 and the estimated size of a reachable set is a function of the value of the highest ranked reachable element.

4. A database query method according to claim 1 wherein the method is used to solve a transitive closure, all-pairs problem.

5. A database query method according to claim 1 wherein the method is used to solve a single-source reachability problem.

6. A database query method according to claim 1 wherein the method is used to determine estimated descendent counts, and the least rank reachable for an element is determined by starting with the least ranked element and assigning the value thereof to all reachable ancestors, and by then going to increasingly higher ranked elements and assigning the value thereof to ancestors not previously assigned a least rank reachable value.

7. A database query method according to claim 1 wherein said method is carried out in serial fashion.

8. A database query method according to claim 1 wherein said method is carried out in parallel fashion.

9. A database method for estimating the size of reachability sets in a database including a plurality of elements each including reachability information to other elements comprising the steps:

a) assigning random ranks to elements in the database;

b) determining the rank of the least ranked element in each of a plurality of reachability sets;

c) repeating steps a) and b) n times; and d) applying an estimator to the n ranks of the least ranked elements in each of the plurality of reachability sets to estimate the size of each of the plurality of reachability sets.

10. A database method according to claim 9 wherein said assigned random ranks have random values between 1 and 0, and the estimated size of a reachable set is a function of the reciprocal of the least ranked reachable element value.

11. A database method according to claim 9 wherein said assigned random ranks have random values greater than 1 and the estimated size of a reachable set is a function of the value of the highest ranked reachable element.

12. A database method according to claim 9 wherein the method is used to solve a transitive closure, all-pairs problem.

13. A database method according to claim 9 wherein the method is used to solve a single-source reachability problem.

14. A database method according to claim 9 wherein the method is used to determine estimated descendent counts, and the least rank reachable for an element is determined by starting with the least ranked element and assigning the value thereof to all reachable ancestors, and by then going to increasingly higher ranked elements and assigning the value thereof to ancestors not previously assigned a least rank reachable value.

15. A database, method according to claim 9 wherein said method is carried out in serial fashion.

16. A database method according to claim 9 wherein said method is carried out in parallel fashion.

17. A database system for determining estimates of the size of reachability sets comprising:

computing means including a database with a plurality of elements each including reachability information to other elements;

means for assigning random ranks to elements in the database;

means for determining the rank of the least ranked element in each of a plurality of reachability sets; and means for applying an estimator to the rank of the least ranked element in each of the plurality of reachability sets to provide an estimate of the size of each of the plurality of reachability sets.

18. A database system according to claim 17 further comprising means for repeating said assignment of random ranks to elements in the database and then determining the least rank in said reachability sets (n) times to improve the accuracy of the estimates.

19. A database system according to claim 17 wherein said means for assigning random ranks assigns random values between 1 and 0, and said means for applying said estimator provides the estimated size of a reachable set as a function of the reciprocal of the least ranked reachable element value.

20. A database system according to claim 17 wherein said means for assigning random ranks assigns random values greater than 1 and said means for applying said estimator estimates the size of a reachable set as a function of the highest ranked reachable element.

21. A database system according to claim 17 used to solve a transitive closure, all-pairs problem.

22. A database system according to claim 17 used to solve a single-source reachability problem.

23. A database system according to claim 17 used to determine estimated descendent counts and further including means for determining the least rank reachable for an element by starting with the least ranked element and assigning the value thereof to all reachable ancestors, and by then going to increasingly higher ranked elements and assigning the values thereof to ancestors not previously assigned a least rank reachable value.

24. A database system according to claim 17 wherein said computing means, means for assigning, means for determining and means for applying are a general purpose computer.

25. A database system according to claim 17 wherein said computing means, means for assigning, means for determining and means for applying comprise a parallel processor.

* * * * *